United States Patent [19]
Ho

[11] Patent Number: 5,485,508
[45] Date of Patent: Jan. 16, 1996

[54] HYBRID COMMUNICATION DEVICES WITH ONE TELEPHONE LINE

[76] Inventor: Geng Kaung Ho, 1119 Grassmere Dr., Richardson, Tex. 75080

[21] Appl. No.: 93,600

[22] Filed: Jul. 19, 1993

[51] Int. Cl.⁶ .................................................. H04M 11/00
[52] U.S. Cl. ................................................ 379/97; 379/102
[58] Field of Search ..................................... 379/102, 104, 379/105, 100, 93, 95–99, 441, 442, 164, 94

[56]  References Cited

U.S. PATENT DOCUMENTS

| 4,821,312 | 4/1989 | Horton et al. | 379/102 |
| 4,953,199 | 8/1990 | Hoshi et al. | 379/97 |
| 5,036,534 | 7/1991 | Gural | 379/93 |
| 5,048,076 | 9/1991 | Mauer et al. | 379/102 |
| 5,056,132 | 10/1991 | Coleman et al. | 379/100 |
| 5,070,523 | 12/1991 | Hafer et al. | 379/94 |
| 5,073,922 | 12/1991 | Okada | 379/164 |
| 5,091,932 | 2/1992 | Tsuda | 379/100 |

Primary Examiner—Wing F. Chan

[57]  ABSTRACT

A interface that connects a single public telephone line to voice telephone devices as well as digital telephone devices. When receiving a telephone call, the interface distributes the incoming telephone call to the telephone devices according to the device signal sent by the caller. When initiating a telephone call, the interface sends a device signal corresponding to the physical position where the initiating telephone device connected to the interface.

7 Claims, 2 Drawing Sheets

HYBRID COMMUNICATION DEVICES WITH ONE TELEPHONE LINE

BACKGROUND OF THE INVENTION

1. Field of the Invention

The present invention relates to a device for selectively controlling the connection of devices to a telephone line.

2. Brief Description of the Prior Art

In recent years, digital communication devices such as MODEM and FAX are often used to share a telephone line with the telephone sets.

Before the telephone call is connected, the telephone user of the receiving and could not differentiate the voice or digital communication source devices. There is no way to automatically guide the telephone call to the expected devices before it is connected. This causes the telephone user to buy an extra phone line for the different digital communication device.

U.S. Pat. No. 5,056,132 to Coleman et al, which was issued on Oct. 8, 1991, teaches a telephone signal switch device to request a code from the caller to identify the incoming communication, the communication is connected to the identified or preselected communication device. This apparatus wastes a call if the identified communication device is telephone hand set but no human answer is available.

U.S. Pat. No. 5,070,523 to Hafer et al, which was issued on Dec. 3, 1991, allows the calling station to select which hand set or device is to be connected by entering a dual-tone multi-frequency code and plans priority of use of the public telephone line by the connected devices. This apparatus fails to direct data of FAX of calling station if the dual-tone multi-frequency is not entered after the initial call in case the called station sets its first priority of communication to telephone hand set. Since "all ports are physically identical and, disregarding priorities, any combination of telephones and other devices can be plugged into ports in any order", how MODEM/FAX of the distant station determines which dual-tone multi-frequency code is needed in order to guide this apparatus to route the data of MODEM/FAX to the desired port? How data of MODEM/FAX are sent through this apparatus to a MODEM/FAX of a distant station which connects MODEM/FAX to telephone jack directly? Changing the micro processor chip to set the priority to direct the communication to the corresponding ports is not easy for customers who buy the product of this invention.

Some telephone companies offer the Special Ring option to give a second telephone number to share same telephone line with the original telephone number. The audible rings of the second telephone number is different with the original one. When receiving a telephone call, telephone line user can realize which telephone number is called. The telephone line users need to pay for the Special Ring option. And the Special Ring option does not help to route the telephone call to certain desired telephone devices.

Carrier detectors, which are used to detect the existence of the telephone carrier and then of carrier and then of the communication between the caller and receiver, usually come with MODEM chips, and are expensive. Stand alone carrier detectors for the telephone carrier are not easy to get from the industry. Designing one could be more expensive.

BRIEF SUMMARY OF THE PRESENT INVENTION

The invention presents an Interface between a single public telephone line and hybrid telephone devices consisting of voice telephone devices such as telephone hand sets, and digital telephone devices such as facsimile machine and MODEM. When a telephone call arrives, said Interface accepts an optional device signal sent from the caller end and distribute the coming telephone call to said telephone devices according to the existence and the catalog of the device signal. When one of the said telephone devices initiates a telephone call, said Interface may send a device signal to the receiver end, according to the choice of the caller or the physical position of the telephone device connected to said Interface at the sender end.

An object of the Interface is, when receiving a telephone call but before answering it, to send a notification signal to the caller end, and to accept a device signal from the caller end for routing the telephone call to telephone devices connected to said Interface, according to said device signal received.

An object of the Interface is, when one of the telephone devices initiates a telephone call but before it is answered, to send a device signal to the receiver end, according to the physical position where the initiating one connected to said Interface.

An object of the Interface is to monitor the existence of the communication by checking different direct voltage between tip and ring of the telephone line.

DETAIL DESCRIPTION OF THE PREFERRED EMBODIMENT

Figure 1:
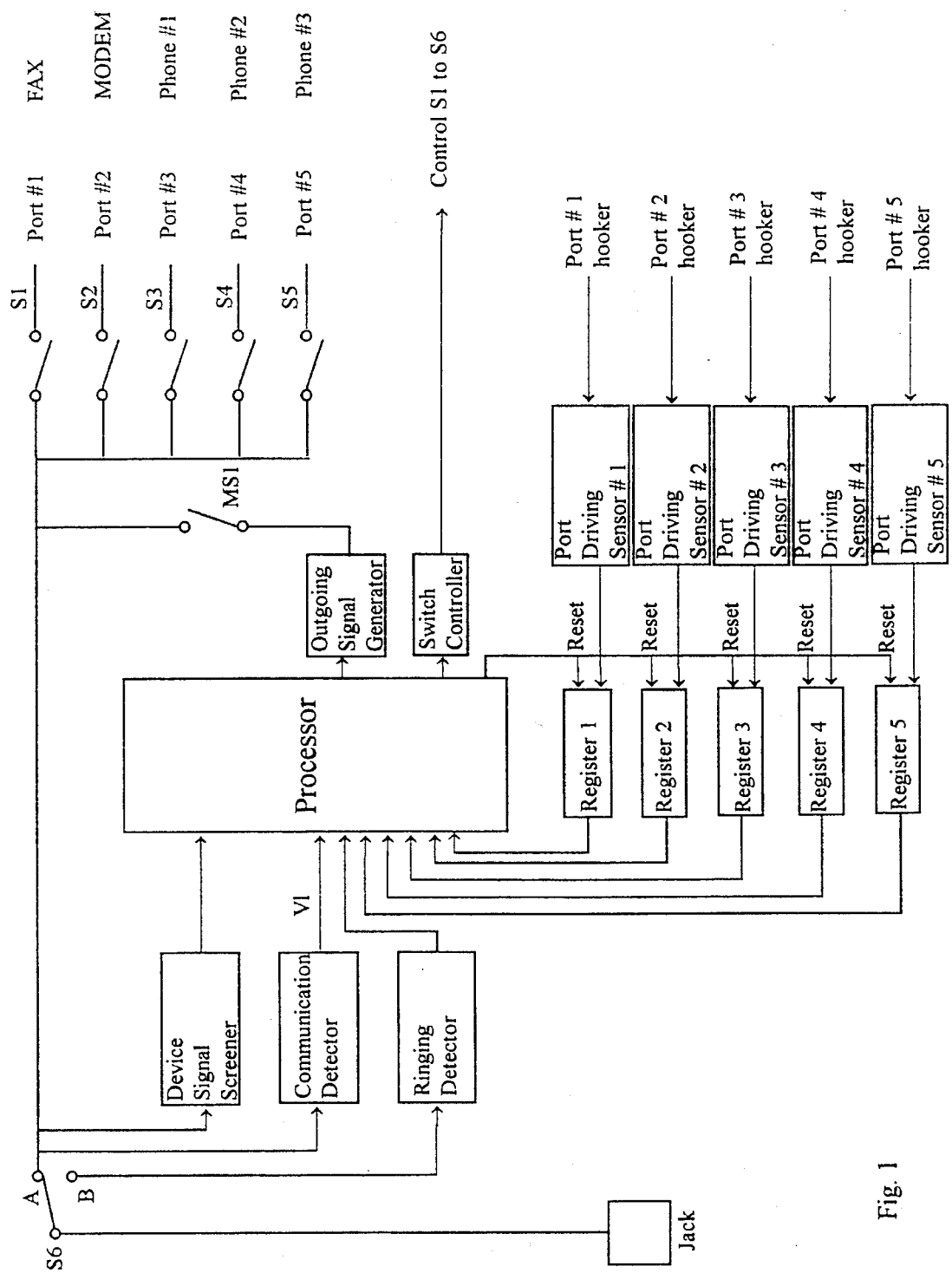
FIG. 1 is a block diagram of the interface.

FIG. 1 is the block diagram of the Interface. Said Interface consists of a Processor, a Device Signal Screener, a Ringing Detector, an Outgoing Signal Generator, a Communication Detector, several Port Driving Sensors, same amount of Registers corresponding to said Port Driving Sensors, a Switch Controller, an Outlet Switch, several Port Switches corresponding to said Port Driving Sensors, and a Manual Switch MS. Said Outlet Switch S6 and said Port Driving Switches, S1, S2, S3, S4, and S5, are controlled by said Switch Controller, which in turn is triggered by said Processor. Said Port Switches connect to voice telephone devices, such as telephone hand sets, and digital telephone devices, such as facsimile machine and MODEM. Opening said Manual Switch MS will disable said Outgoing Signal Generator sending Outgoing Signal to said single public telephone line. For explanation purpose only, this document arranges facsimile machine to Port #1, MODEM to Port #2, telephone hand sets to Port #3, #4, and #5.

There are four function states for the operation of said Interface; Idle State, Call Request State, Call Receive State and Connected State. In said Idle State, said Interface is ready to receive an incoming call or to initiate an outgoing call. In said Call Request State, one of said telephone devices is off-hooked and dials the telephone number of the receiver end, but the receiver end has not answered the phone call. In said Call Receive State, an incoming call is detected by said Ringing Detector and said Device Signal Screener has routed said incoming call to the desired port. And said telephone device(s) is connected to said desired port(s), but has not answered said incoming call yet. In said Call Request State and said Call Receive State, said Communication Detector monitors no communication exists between two ends. Once said Communication Detector monitors the existence of the communication, said Interface proceeds to said Connected State. In said Connected State, once said Communication Detector monitors the non-existence of the communication, said Interface proceeds to said Idle State.

In said Idle State, any one of said telephone device may initiate a telephone call. For instance, when the telephone user makes a off-hook on Port 1, and dials the telephone number of the receiver end, said Port Driving Sensor 1 will sense the off-hook action and set said Register #1, which in turn, stimulates said Processor to connect said Outlet Switch S6 to A, and close said Port Switch S1. Said Processor also opens all other said Port Switches to disable all other said telephone devices. Said Processor also stimulates said Outgoing Signal Generator to generate a device signal corresponding to said Port #1. Said Interface then sends out device signals, through the telephone jack, after said telephone call arrives the receiver end and before the telephone is answered. Said device signal could be key signals on the key pad of said telephone devices. For explanation only, this document uses key signal of key '1' as Port #1's device signal, and key signal of key '2' as Port #2's device signal, etc. After the receiver end responds to the telephone call, said communication Detector will detect the existence of the communication and keep monitoring the continuation of it. Said Interface then proceeds to said Connected State, and the communication can be continuing. When either end of the communication terminates the telephone call, said Communication Detector will detect non-existence of the communication and stimulate said Processor to proceed said Interface to Idle State by opening all said Port Switches, moving said Outlet Switch S6 to B, and reset all said Registers. Said Interface then is ready to initiate or accept a new telephone call.

All other said Port Switches work similarly to said Port Switch #1.

The function of said Outgoing Signal Generator can be performed by DTMF (Dual Tone Multiple Frequency) generator. And Device Signal Screener's function can be performed by a DTMF encoder. A DTMF transceiver can work for both functions. Any other signal which can be transmitted through said public telephone line, are good to be said device signal. Therefore the generator and degenerator for it are not limited to DTMF's.

In said Idle State, said Interface may also accept a telephone call. In said idle state, said Outlet Switch S6 is connected to B. When a telephone call arrives, said Ringing Detector will detect the ring signal and stimulate said Processor move said Outlet Switch S6 to A. Said Processor then waits a while, say 1.5 seconds, and checks the output of said Device Signal Screener to determine the desired ports according to the existence and catalog of device signal sent from the sender end, Said Process then triggers said Switch Controllers to control said Port Switches, which are connected to said telephone devices. Depending on the design, there may be a key on the key pad of said telephone devices assigned to be said device signal for each said telephone device. For instance, key '1' is for Port #1's device signal, and '2' for Port #2's device signal, etc. If the device signal corresponding to said Port #3 is being received by said Device Signal Screener, it will stimulate said Processor to close said Port Switch S3. Telephone hand sets connected to it will take over the telephone call. Since all other said Port Switches are open, all other said telephone devices, no matter voice ones or digital ones, are not aware of the coming of the incoming call and do not get an opportunity to answer the telephone call. This make said Port #3 as a private telephone device to the telephone line user. All other telephone sets can not answer said incoming call, and not be able to listen the communication between sender end and receiver end. Since digit telephone devices can not answer said incoming call, the caller of sending end will not hear digital tones from the receiver end, through said telephone line. If said device signal for one digit telephone device is received, the other digital telephone devices will not be able to answer and all voice telephone devices can not answer either. This avoids the confusion to the sender end and the receiver end. For instance, if device signal of key '1' in the key pad is received by Interface, only facsimile machine can be aware of its coming and answer it. MODEM can not answer. Neither all telephone hand sets. Answering machine connected to other port can not answer it with voice mail either. If facsimile machine is not available, the caller sending the telephone will be aware and quit the phone call. The telephone company will not charge this telephone call. This is economical especially for long distance calls. The signal of a key on the key pad may be assigned to be said device signal for all digit telephone devices, and the signal of other key for all voice telephone devices. For instance, if key '#' is for all digit telephone devices, and '*' is for all voice devices, then when said Interface receives a signal of key '#', said Device Signal Screener will stimulate said Processor to trigger said Switch Controller to close said Port Switch #1, and #2, to let facsimile machine and MODEM take over the incoming telephone call. By the same token, receiving '*' will close said Port Switch #3, #4, and #5 and let all telephone hand sets take over the incoming telephone call.

When said Interface is receiving a telephone call, opening said Manual Switch MS stops sending the output of said Outgoing Signal Generator to the public telephone line. This will avoid to annoy the telephone devices' user at the receiver end, if they have never heard said Interface.

Figure 2:
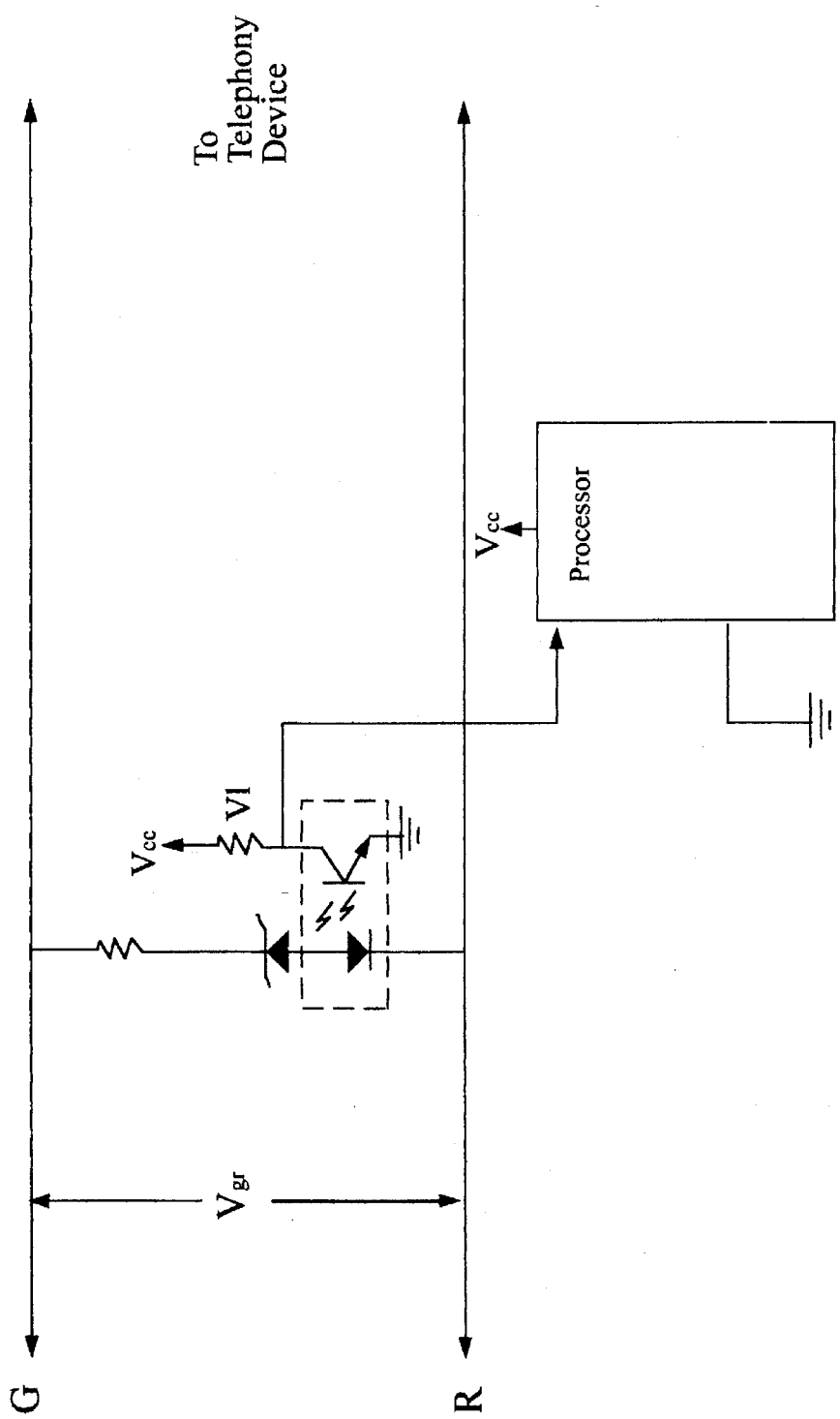
FIG. 2 is a schematic diagram of the communication detector.

Usually, a carrier detector is used to monitor the existence of the communication. But it often comes with MODEM Integration Circuit(IC) chip, and are expensive. Standing alone carrier detector needs design of a carrier frequency detector and could be more expensive. Said Interface uses said Communication Detector to check the direct voltage between tip an ring of the public telephone line. FIG. 2 is the schematic diagram of said Communication Detector. When Vgr is about 48 volts, no communication is continuing. And VI is about 0 volt. This low level of VI will stimulate said Processor to convert said Interface from said Connected State to Idle State. On the other hand, when Vgr is about 5 volts then communication is continuing. And VI is close to Vcc. This high level of VI will stimulate said Processor do nothing, except continue to check VI. Said Interface will keep in said Connected State.

I claim:

1. An interface between a single telephone line and telephone devices, consisting both digital devices and voice devices for automatically generating a device signal based on each of the physical position of ports connected to said telephone devices which initiates the phone call, comprising:

a. device signal generator for generating said device signal;

b. several port driving sensors to detect off-hook action of one of said telephone devices;

c. several registers to keep the output of said port driving sensors, for memory of off-hook action of one of said telephone devices;

d. a processor to read the output of said registers and to stimulate said device signal generator to generate said device signal based on the memory of off-hook action of said registers;

e. a communication detector to monitor the existence of communication between sender end and receiver end;

f. port switches to connect to or disconnect said telephone devices with said interface;

g. a switch controller to be triggered by said processor according to the outputs of said register and said communication detector to connect or disconnect said port switches;

h. and outlet switch controlled by said switch controller, to connect said interface to said telephone line and send said device signal to said telephone line.

2. An interface according to claim 1 further comprising means for screening a device signal informing the physical of port of the desired telephone device, but not the characteristic of the calling telephone device, and not sent by the caller responding to the synthesized voice from said interface, and directly route the incoming phone call to the desired telephone device, comprising:

a. a ringing detector to detect ringing signal of the incoming telephone call;

b. a device signal screener to accept said device signal, and pick up from said device signal said physical position of the desired telephone device;

c. said processor to also read the outputs of said device signal screener, said ring detector, and said communication detector and to trigger said switch controller to close or open said port switches for routing the telephone call to said telephone device based on the said physical position received by said device signal screener;

3. The interface according to claim 1 or 2 further comprising means for choosing a desired telephone device on the receiving end by responding to a signal of a certain key on the key pad of a sender telephone device assigned as said device signal.

4. The interface according to claim 1 or claim 2 wherein said communication detector checks the direct voltage between the tip and the ring of the telephone line to detect the continuation of the communication.

5. The interface according to claim 1, further comprising a manual switch to stop sending said device signal to said telephone line.

6. The interface according claim 1 or claim 2 wherein said device signal informing said physical position of ports is any signal which can be sent by telephone line.

7. The interface according to claim 1 or claim 2, wherein said device signal can be generated and detected by a dual-tone multi-frequency transceiver.

* * * * *